(12) United States Patent
Fischer

(10) Patent No.: US 6,493,492 B1
(45) Date of Patent: Dec. 10, 2002

(54) FIBER BUNDLE AND OPTICAL AMPLIFIER

(75) Inventor: George L Fischer, Long Valley, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 136 days.

(21) Appl. No.: 09/648,978

(22) Filed: Aug. 28, 2000

(51) Int. Cl.[7] .................................................. G02B 6/04
(52) U.S. Cl. ........................ 385/115; 385/146; 385/96; 385/50; 372/70; 359/341.1
(58) Field of Search ........................... 385/115, 27, 146, 385/121, 96, 50, 147; 359/341.1, 341.3, 341.32; 372/70, 69

(56) References Cited

U.S. PATENT DOCUMENTS

| | | | | |
|---|---|---|---|---|
| 2,992,516 A | * | 7/1961 | Norton | ........................ 385/115 |
| 4,547,040 A | * | 10/1985 | Yamamoto | ................... 385/115 |
| 4,763,975 A | * | 8/1988 | Scifres | ........................... 372/6 |
| 5,263,036 A | * | 11/1993 | De Bernardi | ................... 372/6 |
| 5,999,673 A | | 12/1999 | Valentin et al. | |

* cited by examiner

Primary Examiner—Cassandra Spyrou
Assistant Examiner—Leo Boutsikaris
(74) Attorney, Agent, or Firm—John F. McCabe

(57) ABSTRACT

A manufacture includes a first optical fiber and a plurality of second optical fibers. The second optical fibers have cross sections with aspect ratios of two or more. Distal sections of the fibers form a bonded structure. In the bonded structure, each distal section is bonded along a length of another one of the distal sections and along a section of the first optical fiber.

17 Claims, 6 Drawing Sheets

FIBER BUNDLE AND OPTICAL AMPLIFIER

BACKGROUND OF THE INVENTION

1. Field of the Invention

This invention relates to optical fibers and optical fiber amplifiers.

2. Discussion of the Related Art

Some optical amplifiers use a doped optical fiber to perform optical amplification. The doped amplifier fiber receives both multi-mode pump light and a single-mode input optical signal for amplification. One arrangement introduces both the pump light and the input optical signal into one end of the amplifier fiber. Since the pump light and input optical signals come from separate fibers, these fibers are often combined into a bundle prior to coupling to the amplifier fiber. The fiber bundle improves the coupling with the amplifier fiber.

FIG. 1 shows a portion of a fiber amplifier 10 that uses a conventional fiber bundle 12. The fiber bundle 12 optically couples through end 13 to amplifier fiber 14, e.g., a multi-modal fiber having erbium and/or ytterbium dopants. The fiber bundle 12 incorporates two or more pump fibers 16–21 and input fiber 24. Each pump fiber 16–21 receives pump light at one end from a single laser diode 27–32 and transports the light by total internal reflection to end 13, which couples to the amplifier fiber 14. The input fiber 24 delivers the optical signal to be amplified. Near the end 13, fibers 16–21, 24 of fiber bundle 12 have been bonded together.

FIG. 2 is a cross-sectional view of the end 13 of the fiber bundle 12 shown in FIG. 1. The input fiber 24 is a single-mode optical fiber located at the center of the fiber bundle 12. The pump fibers 16–21 are multi-mode optical fibers located around the circumference of the input fiber 24.

The complete fiber bundle 12 and amplifier fiber 14 may have different outer diameters. If the diameters differ, a region 26 of the fiber bundle 12 adjacent the joint end 13 is tapered so that the fiber bundle's diameter matches that of the amplifier fiber 14 at the joint. Matching the outer diameters improves light transfer from the fiber bundle 12 to the amplifier fiber 14.

The amplifier fiber may have an outer core with a polygonal cross section that enhances the coupling of pump light to the optically active dopants.

Various features of the fiber bundle 12 and amplifier fiber 14 improve optical couplings in fiber amplifier 10. But, still better optical couplings are desirable to push amplifiers to even higher optical gains.

SUMMARY OF THE INVENTION

In one aspect, the invention features a manufacture. The manufacture includes a first optical fiber and a plurality of second optical fibers. The second optical fibers have cross sections with aspect ratios of two or more. Distal sections of the fibers form a bonded structure. In the bonded structure, each distal section bonds along a length to another one of the distal sections and to the first optical fiber.

In a second aspect, the invention features an apparatus. The apparatus includes a plurality of laser diodes and a fiber bundle. The fiber bundle includes a first optical fiber and a plurality of second optical fibers. The second optical fibers have cross sections with an aspect ratio of two or more. Distal sections of the fibers form a bonded structure in which each section bonds along a length to another one of the sections and to the first optical fiber. Each laser diode is optically coupled to one of the laser diodes.

In a third aspect, the invention features a process for amplifying an input optical signal. The process includes transmitting pump light from laser diodes into associated pump optical fibers. The fibers have cross sections with aspect ratios of at least two. The process also includes delivering the transmitted pump light to one end of an amplifier optical fiber and transmitting the input optical signal into one end of the amplifier optical fiber.

DETAILED DESCRIPTION OF THE INVENTION

Figure 1:
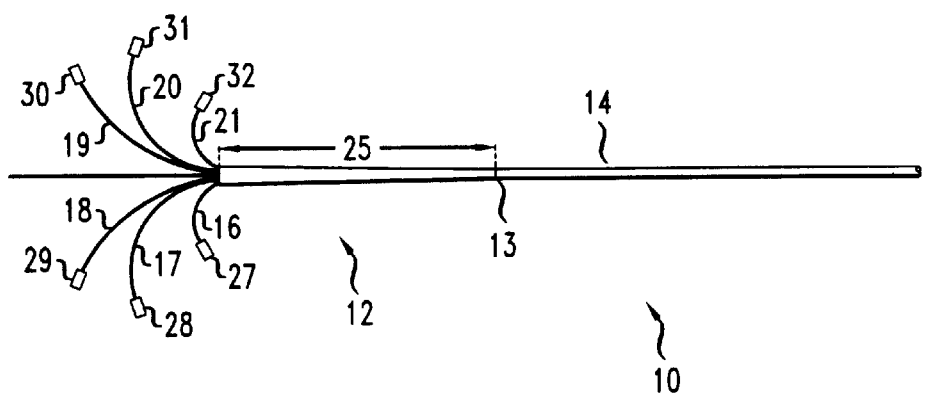
FIG. 1 is a side view of a portion of a conventional optical amplifier.
Figure 3:
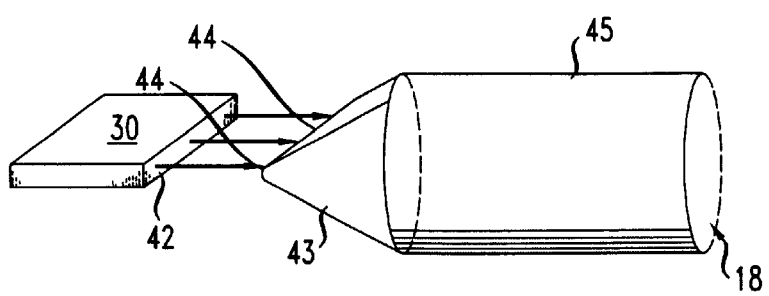
FIG. 3 is a side view showing a coupling of a laser diode to a pump fiber shown in FIG. 1.

FIG. 3 illustrates an optical coupling between laser diode 30 and associated pump fiber 18 for conventional amplifier 10 of FIG. 1. The laser diode 30 has an elongated rectangular emission surface 42 that emits a laser light beam with an elongated rectangular cross section. The emitted light beam propagates towards end 43 of pump fiber 16. Since the beam's cross section is elongated, the beam only covers a narrow band-like area on the end 43 of the pump fiber 16.

Herein, elongated surface regions have aspect ratios of at least two, two to four, or greater. Herein, the aspect ratio is a ratio of a largest width of the relevant region over a smallest width of the region. For example, the aspect ratio of a rectangular cross section is the ratio of the length of the rectangle's diagonal over the length of the rectangle's shortest side.

To improve the coupling to laser diode 30, end 43 of pump fiber 18 is given a chiseled shape. The apex of the end 43 forms a cylindrical lens 44. Emission surface 42 is located on the focal plane of the lens 44 so that the lens 44 collimates incident laser light into the pump fiber 18. After being collimated, the light propagates more parallel to the axis of the pump fiber 18, which results in less light leakage through lateral surface 45 of the fiber 18. Nevertheless, a large difference between the cross-sectional area of the emission surface 42 and that of pump fiber 18 greatly diminishes the intensity of the laser light in the fiber 18. Furthermore, the circular form of pump fibers 16–21 wastes packing space in conventional fiber bundle 12 and limits the number of diodes 27–32 that can be efficiently coupled to amplifier fiber 14.

Figure 4A:
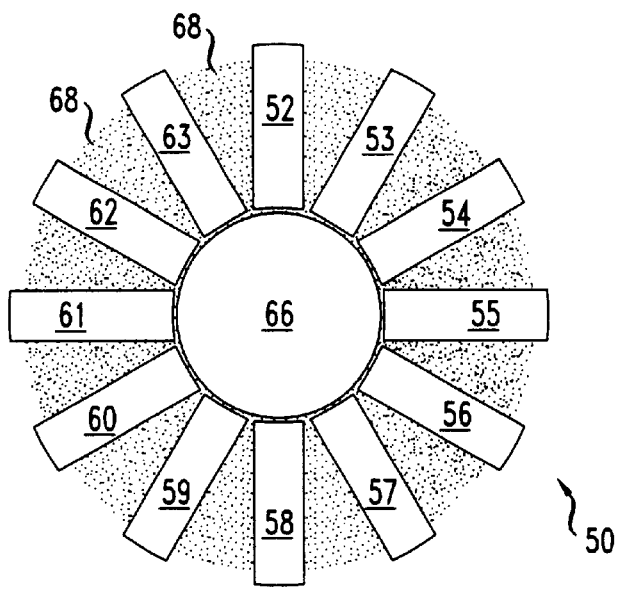
FIG. 4A is an end view of one embodiment of a fiber bundle.

FIG. 4A shows the bonded end of one embodiment of a fiber bundle 50. The fiber bundle 50 uses pump fibers 52–63 with elongated rectangular cross sections, e.g., multi-mode optical fibers. The pump fibers 52–63 are packed around the circumference of a central optical fiber 66 where adjacent pump fibers 52–63 touch. A silicon-based material 68 bonds the fibers 52–63, 68 together in the bonded end.

The central fiber 66 has a circular cross section that may be larger than, smaller than, or equal to the length of long sides of the rectangular cross sections of the pump fibers 52–63. The central optical fiber 66 is either a single-mode or a multi-mode fiber. Long sides of cross sections of the pump fibers 52–63 are radially oriented with respect to the center of the central fiber 66.

Figure 4B:
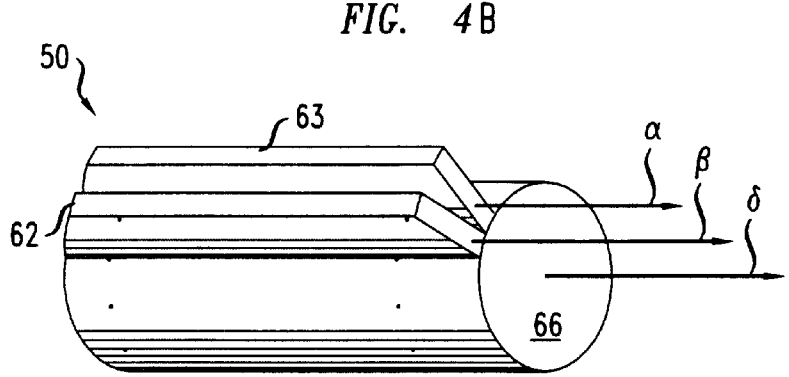
FIG. 4B is an oblique view of several fibers near the fused end of the fiber bundle shown in FIG. 4A.

Referring to FIGS. 4A and 4B, a section of each pump fiber 52–63 is bonded to adjacent pump fibers 52–63 and to the central fiber 66 to form a bonded structure 83. In the bonded structure 83, 3–5 millimeter or longer lengths of the fibers 52–63, 66 are bonded together. The bonding keeps the fibers 52–63, 66 parallel, in the structure, so that angular divergences between the fibers 52–63, 66, e.g., between exemplary axes $\alpha$, $\beta$, $\gamma$, are less than 5°, 10°, or 15°.

Figure 2:
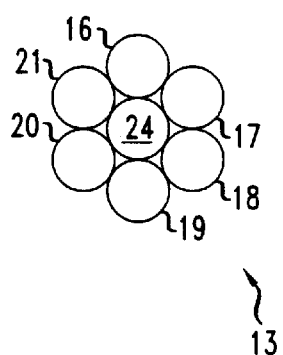
FIG. 2 is a cross-sectional view of the bonded end of a conventional fiber bundle shown in FIG. 1.

Some embodiments of fiber bundle 50 use pump fibers 52–63 with cross sections having aspect ratios of two, three, four or more. More pump fibers 52–63 can be incorporated into fiber bundle 50 than in conventional fiber bundle 10 of FIGS. 1–2 if the long sides of the cross sections of the pump fibers 52–63 are radially oriented with respect to the axis of central fiber 66. With more pump fibers 52–63, the bundle 50 can deliver more pump light or operate diodes 84, 89, 90, 95 at lower power levels to provide the same amount of pump light to amplifier fiber 82 as a prior art fiber bundle. The number of pump fibers 52–63 may however, differ in different embodiments of the fiber bundle 50.

In various embodiments, the cross sections of the pump fibers 52–63 are elongated polygons with three, four, five, or six sides. The polygonal cross sections may be produced by grinding surfaces of core preforms used in the manufacture of ordinary round or cylindrical multi-modal fibers. The grinding produces flat side surfaces of the selected polygonal cross section.

In some embodiments, cross sections of pump fibers 52–63 are elongated, e.g., polygons with rounded corners. Aspect ratios of cross sections of these fibers are equal to or greater than two, three, or four.

Figure 5:
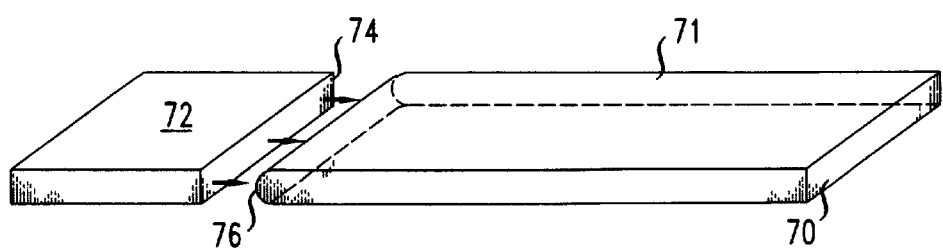
FIG. 5 shows how a laser diode couples to one pump fiber of the fiber bundle shown in FIGS. 4A and 4B.

FIG. 5 illustrates an optical coupling between a rectangular pump fiber 70, e.g., one fiber 52–63 of FIG. 4, and an associated laser diode 72. In some embodiments, more than one pump fiber may couple to the same diode.

The position and orientation of the pump fiber 72 enables light from an elongated emissive surface 74 of the laser diode 72 to illuminate an area on end 76 of the pump fiber 70. The fiber's cross section is elongated and similar in shape to the emission surface 74 as defined by aspect ratios, i.e., both have aspect ratios at least as large as two. Light from the laser diode 72 illuminates a larger fraction of the area of the end 76 of fiber 70 than would be illuminated if the pump fiber was cylindrical (not shown) and had a diameter equal to the longest dimension of the emissive surface 74. The end 76 of the pump fiber 70 forms a cylindrical lens that collimates light received from the laser diode 72. In some embodiments, the end 76 is chiseled down, and the end's apex is a 2-dimensional hyperbolic lens.

Pump fiber 70 optically couples to laser diode 72, which has a long light-emitting surface 74, and is capable of collecting the emitted light as well as a cylindrical fiber, e.g., fiber 18 of FIG. 3. Nevertheless, the light intensity in the pump fiber 70 is higher than the intensity would be in a cylindrical fiber, because the fiber 70 has a smaller cross-sectional area. The smaller cross section enables either less tapering of or more pump fibers to be combined in a fiber bundle than in conventional fiber bundles.

Figure 6:
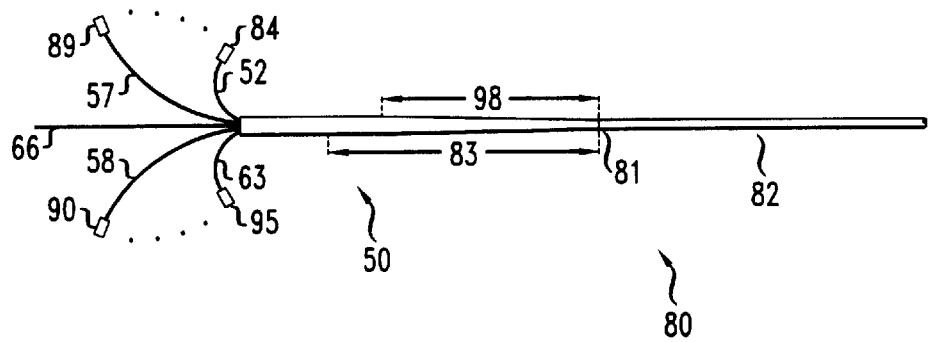
FIG. 6 shows an embodiment of a fiber amplifier that uses the fiber bundle of FIGS. 4A and 4B.

FIG. 6 shows a portion of a fiber amplifier 80 that uses the fiber bundle 50 of FIG. 4. In the amplifier 80, one end 81 of the fiber bundle 50 optically couples to one end of an amplifier optical fiber 82. The amplifier fiber 82 may be single- or multi-modal. The end 81 is also adjacent the bonded structure 83 in which various fibers 57–63, 66 of the fiber bundle 50 are fixed parallel to each other. The fiber bundle 50 is aligned so that the fibers 57–63, 66 are also parallel to the amplifier fiber 82 near the end 81.

The central fiber 66 is typically either an input fiber for signals ready for amplification by the amplifier fiber 82 or an output fiber for signals already amplified by the amplifier fiber 82. A second fiber (not shown) couples to a second end of the amplifier fiber 82 and either receives amplified output optical signals from or transmits input optical signals to the amplifier fiber 82.

In some embodiments, amplifier fiber 82 has active dopant atoms, e.g., rare-earth elements like erbium and/or ytterbium. The dopant atoms participate in optical amplification, i.e., by maintaining inverted populations of states. The amplifier fiber 82 may also have a double core in which an outer core surrounds an inner core. In such a double core fiber, the outer core may have a polygonal cross section that aids to guide multi-modal pump light into the inner core, which carries the signal to be amplified.

The pump fibers 52–63 deliver light from associated laser diodes 84–95 to the amplifier fiber 82. The fiber bundle 50 may have more pump fibers 52–63 than prior art fiber bundle 10 of FIGS. 1–2, because the fibers 52–63 have elongated cross sections. If pump fibers of both bundles carry the same amount of light, the fiber bundle 50 delivers more pump light to the amplifier fiber 82 than the fiber bundle 10 due to the more numerous pump fibers 52–63.

Some embodiments of fiber bundle 50 and amplifier fiber 82 have different outer diameters. In these embodiments, a section 98 of the fiber bundle 50 has an outer diameter that gradually tapers down to match the outer diameter of the amplifier fiber 82.

Figure 7A:
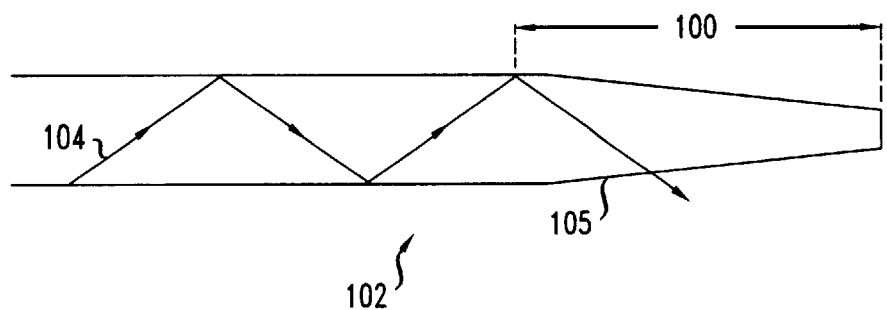
FIG. 7A illustrates light leakage in a tapered section of an optical fiber.

FIG. 7A shows a tapered section 100 of an optical fiber 102 and a light ray 104 propagating in the fiber 102. The tapering can cause light leakage due to transmission through non-parallel surfaces 105 of the fiber 102. Transmission occurs if a light ray 104 is incident on the tapered surface 105 at an angle that is less than the critical angle for total internal reflection. If light rays are transmitted through side surface 105, the tapered section 100 leaks light energy.

Figure 7B:
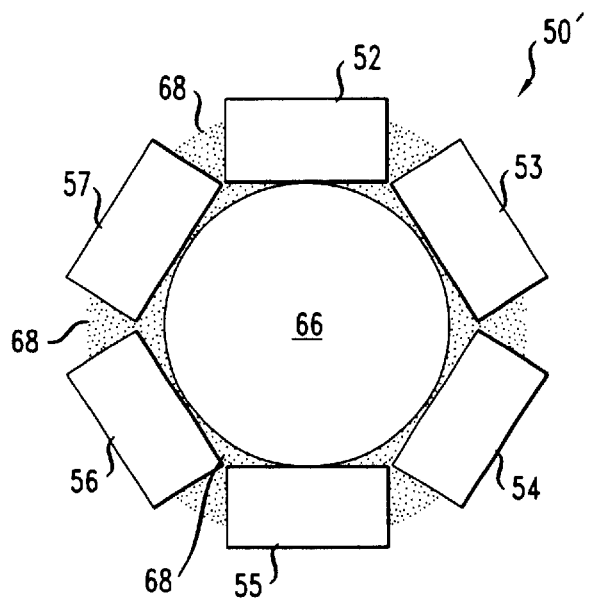
FIG. 7B is a cross-sectional view of the bonded end of an alternate embodiment of a fiber bundle.

FIG. 7B is a cross-sectional view of an alternate fiber bundle 50' used by an alternate embodiment of amplifier 80 shown in FIG. 6. In the fiber bundle 50', the pump fibers 52–57 are arranged so that elongated directions of the fiber's cross sections are tangential to central fiber 66. For this arrangement of the pump fibers 52–57, the fiber bundle 50' has a smaller overall cross-sectional area than conventional fiber bundle 12 of FIGS. 1–2, even if both bundles 50', 12 have the same number of pump fibers and central fibers 66, 24 of the same diameter. The smaller overall cross-sectional area results from the smaller cross-sectional areas for the rectangular pump fibers 52–57 than for cylindrical pump fibers 16–21. Due to the smaller overall cross-sectional area, tapered section 98 needs less tapering than region 26 if both bundles 50', 12 couple to amplifier fibers 82, 14 with the same outside diameter. Less tapering results in less leakage of pump light from the tapered section 98 of fiber bundle 50' than from the tapered region 26 of the bundle 12.

Figure 8:
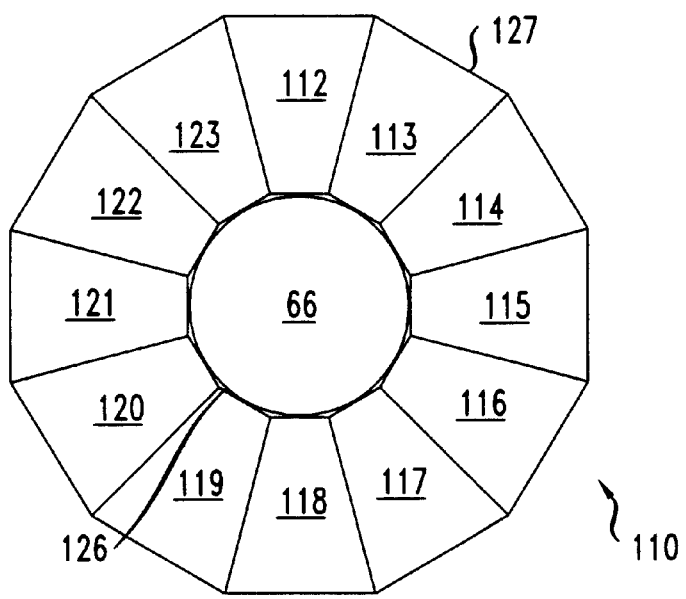
FIG. 8 is an end view of another embodiment of a fiber bundle that can be used in the amplifier of FIG. 6.

FIG. 8 is a cross-sectional view of a bonded end of another embodiment of a fiber bundle 110. In the fiber bundle 110, the pump fibers 112–123 have trapezoidal cross sections. The lengths of the shortest side 126 and longest side 127 of each trapezoid differ by a factor of two or more or three or more. The pumping fibers 112–123 are densely packed around the circumference of central fiber 66 so that the long sides of the trapezoidal cross sections are oriented radially with respect to the center of central fiber 66. The long sides of adjacent pump fibers 112–123 touch in the fiber bundle 110.

Figure 9:
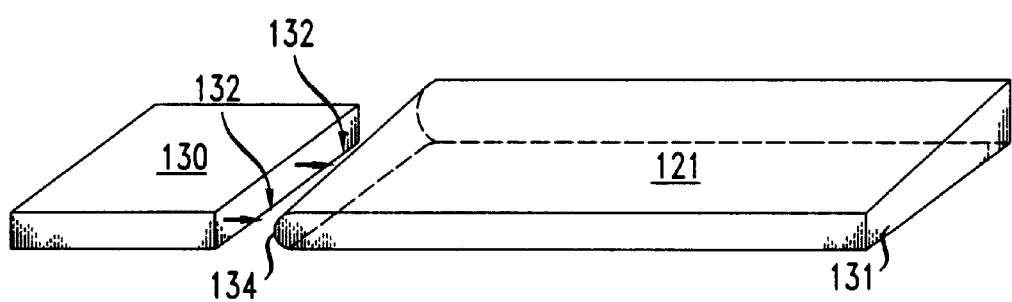
FIG. 9 shows how a laser diode couples to one pump fiber of the fiber bundle shown in FIG. 8.

FIG. 9 shows an optical coupling between trapezoidal pump fiber 121 of FIG. 8 and a laser diode 130 that provides pump light. The trapezoidal pumping fiber 121 is similar in shape to the light beam 132 from the diode and is located so that a large portion of the lens-shaped fiber end 134 is illuminated by the beam 132. Thus, the light intensity is higher in the pump fiber 121 than in a conventional cylindrical fiber (not shown) configured to capture the light emitted by the laser diode 130.

Figure 10:
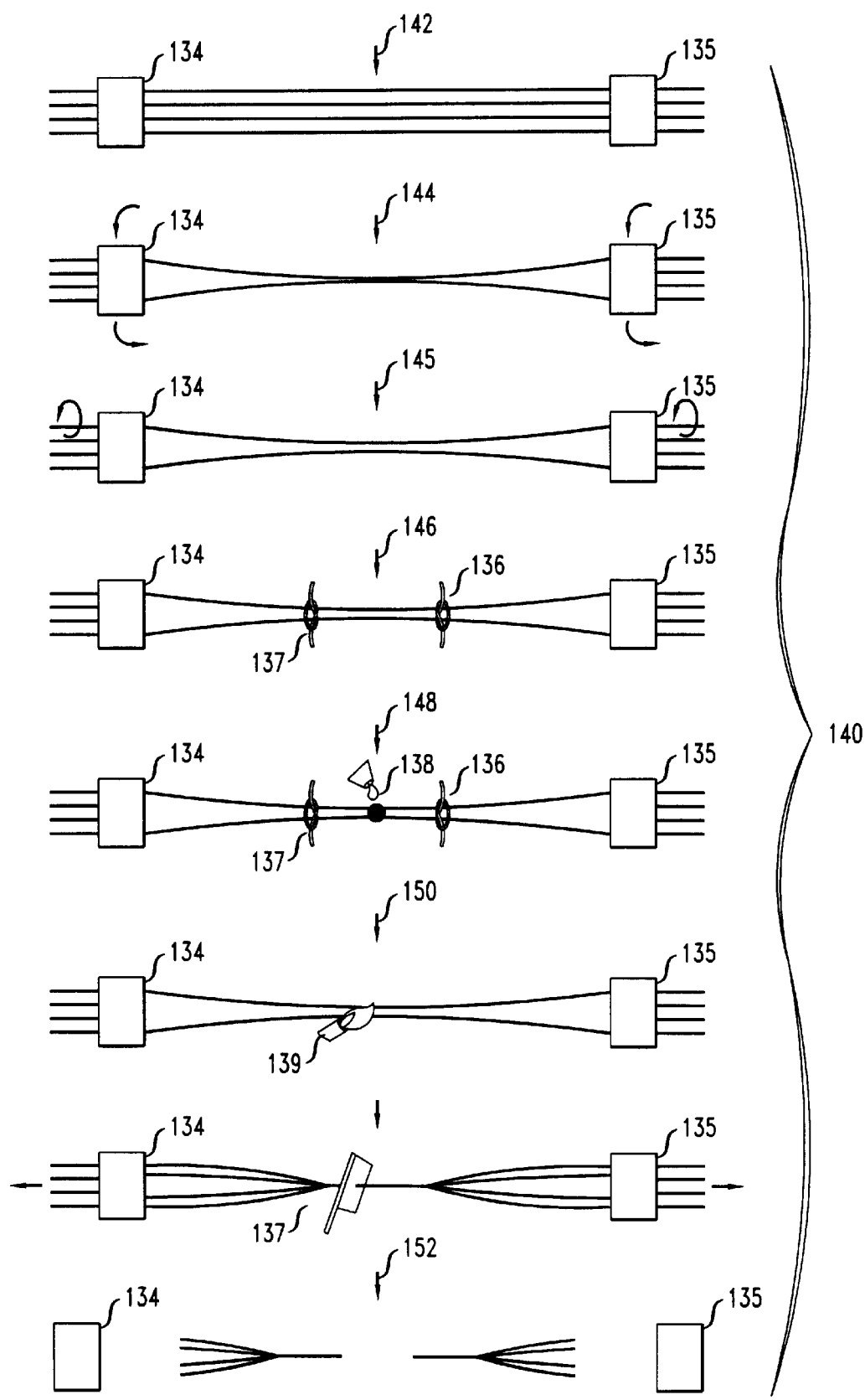
FIG. 10 is a sequence of views illustrating a process that bonds sections of fibers to form the fiber bundles shown in FIGS. 4A, 4B, 6 and 8.

FIG. 10 illustrates one embodiment of a process 140 for manufacturing bonded structures 83 of the fiber bundles 50, 50', and 110 shown in FIGS. 4A–4B, 7B, and 8. The process 140 starts by threading pump and central fibers, e.g., the fibers 52–63, 66 of FIGS. 4A–4B and 6, through holes in two jigs 134–135 (step 142). The holes keep apart portions of the fibers outside the region to be bonded and enables manipulation of individual ones of the fibers. After threading the fibers, an operator twists the jigs 134–135 by about ½ turn while maintaining a tension on the fibers (step 144). The twist makes the fibers cross in a crossing region. Then, the operator rotates individual ones of the fibers to make the fibers mesh with a desired cross-sectional arrangement in the crossing region (step 145). Cross-sectional views of two arrangements are shown in FIGS. 4A and 7B. The crossing region can be observed with a microscope to determine whether the fibers are positioned with the desired cross-sectional arrangement.

After rotating the fibers to a desired cross-sectional arrangement, the operator ties cords 136, 137 around each side of the region to be bonded (step 146). After tying off the region, the operator untwists the jigs 134, 135 and applies one or more drops 138 of a silica-based sol-gel to guard the relative arrangement of the fibers therein (step 148). After the sol-gel dries, releasing tension on the fibers the jigs 134, 135 does not change their arrangement in the bonded region.

To permanently bond the fibers in structure 83, the operator heats the bonded region with a hydrogen torch 139 (step 150). The operator removes the bonded region from the furnace 139 and cuts the center of the bonded region, e.g., using a cleaver, to produce two fiber bundles (step 152). Half of the original bonded region makes up the bonded structure 83 shown in FIG. 6 or in cross section by one of FIGS. 4A, 7B, or 8.

The tapering of the bonded structure 83 to a selected outer diameter may proceed by techniques known to those of skill in the art. The techniques may include pulling one end of the bonded structure while heating a segment of the structure.

Figure 11:
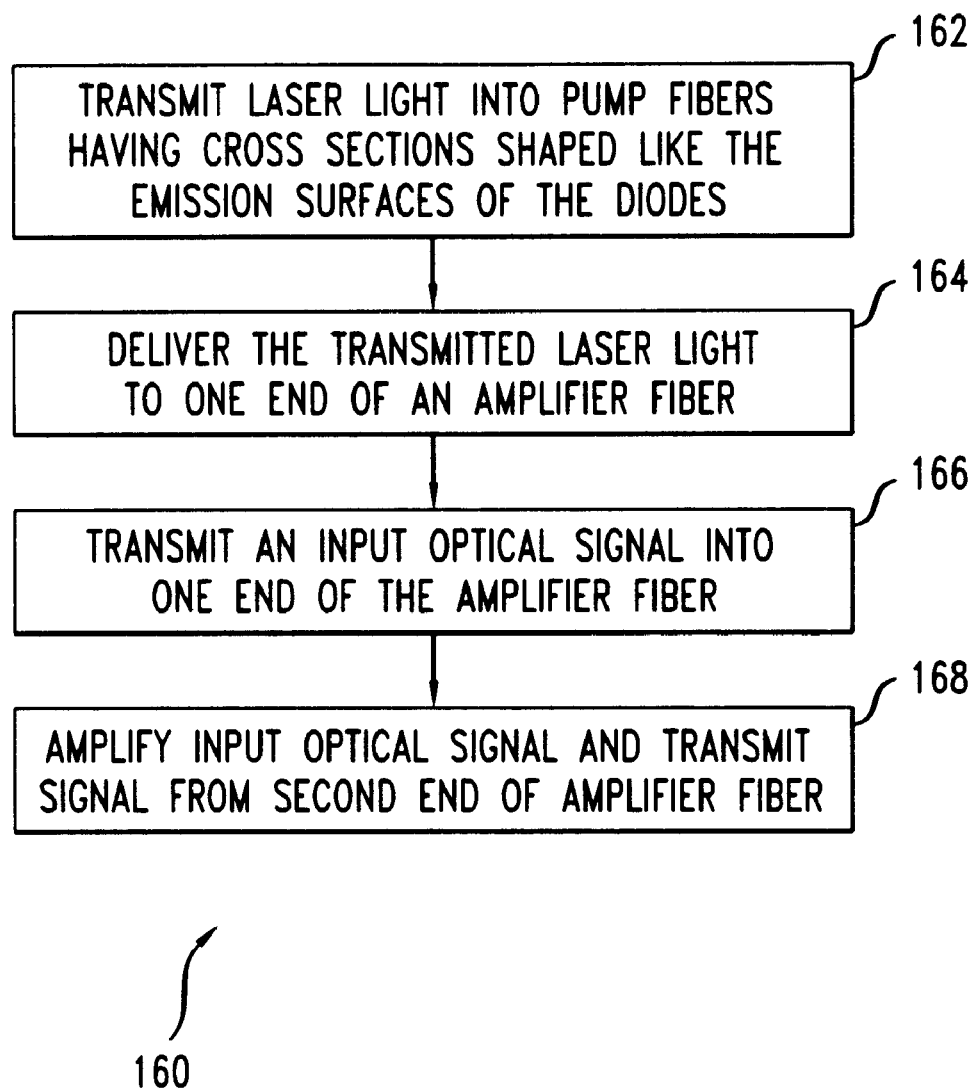
FIG. 11 is a flow chart for a process that amplifies an input optical signal with the fiber amplifier of FIG. 6.

FIG. 11 is a flow chart for a process 160 that amplifies an input optical signal using the amplifier 80 of FIG. 6. The process 160 transmits laser light from laser diodes 84–95 into ends of pump optical fibers 52–63 having cross sections shaped like the cross sections of the beams emitted by the laser diodes 84–95, i.e., both have aspect ratios equal to two, three, or more (step 162). The process 160 delivers the transmitted laser light via the pump fibers 52–63 to one end of amplifier fiber 82 (step 164). The pump light excites dopants, e.g., erbium and ytterbium, in the amplifier fiber 82 to produce an inverted population. Then, the process 160 transmits an input optical signal into one end of the amplifier fiber 82 (step 166). For example, the input optical signal is delivered by central fiber 66 of the fiber bundle 50. Then, the process 160 amplifies the input optical signal in the amplifier fiber 82 and transmits the amplified signal from the amplifier fiber's second end (step 168).

The process 160 delivers the pump light and input optical signal to the same end or to opposite ends of the amplifier fiber 82. If input signal and pump light arrive at the same end, they are transmitted to the respective inner and whole core portions of the end of the amplifier fiber 82.

Other embodiments use fiber bundles 50, 50', and 110 of FIGS. 4A, 7B, and 8 in other types of optical devices. For example, optical transmitters may use the fiber bundles to end couple a plurality of fibers, i.e., fibers 52–63 of FIG. 4A, to one multi-modal transmission fiber. In such embodiments, the central fiber may or may not transport light. These uses of fiber bundles may be useful in multiplexed optical networks.

From the disclosure, drawings, and claims, other embodiments of the invention will be apparent to those skilled in the art.

What is claimed is:

1. A manufacture, comprising:
   a first optical fiber; and
   a plurality of second optical fibers whose cross sections have aspect ratios of two or more, distal sections of the fibers forming a bonded structure, each distal section being bonded along a length of another one of the distal sections and along a length of the first optical fiber; and
   wherein the first optical fiber has a cross section with an aspect ratio that is smaller than the aspect ratios of the cross sections of the second optical fibers.

2. The manufacture of claim 1, wherein the structure has an outer diameter, the outer diameter tapering down to a smaller value near an end of the structure.

3. The manufacture of claim 1, wherein the cross sections of the second optical fibers are rectangular.

4. The manufacture of claim 3, wherein the second fibers have cross sections of one size.

5. The manufacture of claim 3, wherein the second fibers are positioned around an outer circumference of the first fiber in the structure.

6. The manufacture of claim 5, wherein each rectangular cross section has longer and shorter edges, the longer edges being oriented approximately radially with respect to an axis of the first fiber.

7. The manufacture of claim 5, wherein the first fiber has a circular cross section and is a single-mode fiber.

8. The manufacture of claim 1, wherein the cross sections of the second optical fibers are trapezoids, lengths of longest and shortest sides of the trapezoids differing by at least a factor of two, and the second optical fibers are positioned around an outer circumference of the first optical fiber.

9. An apparatus, comprising:
   a plurality of laser diodes; and
   a fiber bundle comprising:
      a first optical fiber; and
      a plurality of second optical fibers having cross sections with an aspect ratio of two or more, distal sections of the fibers forming a bonded structure, each distal section being bonded along a length of another one of the distal sections and along a length of the first optical fiber, each laser diode being optically coupled to one of the second optical fibers, and
   wherein the first optical fiber has a cross section with a smaller aspect ratio than the cross sections of the second optical fibers.

10. The apparatus of claim 9, wherein each second fiber has a cross section with an elongation direction, the elongation direction being oriented parallel to an elongation direction of an emissive face of the laser diode coupled to the fiber.

11. The apparatus of claim 9, wherein each second fiber has a rectangular cross section.

12. The apparatus of claim 9, further comprising:
   an amplifier optical fiber optically end coupled to the bundle.

13. The apparatus of claim 12, wherein an outer diameter of the structure varies gradually between first and second values, the second value being an outer diameter of the amplifier optical fiber.

14. The apparatus of claim 12, wherein the amplifier optical fiber is doped with one or more rare-earth dopants.

15. A process of amplifying an input optical signal, comprising:
   transmitting pump light from diodes into associated pump optical fibers, the pump optical fibers having cross sections with aspect ratios of at least two;
   delivering the transmitted pump light through the pump fibers to one end of an amplifier optical fiber; and
   transmitting the input optical signal into one end of the amplifier optical fiber via a transmission optical fiber, distal sections of the pump fibers being bonded along a length of the transmission optical fiber to form a fiber bundle, the transmission optical fiber having a cross section with a smaller aspect ratio than the cross sections of the pump optical fibers.

16. The process of claim 15, wherein a portion of the delivered pump light and the transmitted input optical signal enter relatively outer and inner regions of the end of the amplifier optical fiber.

17. The process of claim 16, wherein the delivering includes sending the pump light along a fiber with a ribbon-like form.

* * * * *